US009898319B2

(12) United States Patent
Hsu et al.

(10) Patent No.: US 9,898,319 B2
(45) Date of Patent: Feb. 20, 2018

(54) METHOD FOR LIVE MIGRATING VIRTUAL MACHINE

(71) Applicant: National Central University, Taoyuan (TW)

(72) Inventors: Fu-Hau Hsu, Taichung (TW); Tzung-Ting Lin, Taipei (TW); Wei-Tai Cai, Taichung (TW); Chia-Hao Lee, Taoyuan (TW)

(73) Assignee: National Central University, Taoyuan (TW)

( * ) Notice: Subject to any disclaimer, the term of this patent is extended or adjusted under 35 U.S.C. 154(b) by 287 days.

(21) Appl. No.: 14/735,123

(22) Filed: Jun. 9, 2015

(65) Prior Publication Data

US 2016/0239329 A1 Aug. 18, 2016

(30) Foreign Application Priority Data

Feb. 12, 2015 (TW) .............................. 104104834 A (51) Int. Cl.
*H04L 29/06* (2006.01)
*G06F 9/455* (2018.01)
*H04L 29/12* (2006.01)

(52) U.S. Cl.
CPC ...... *G06F 9/45558* (2013.01); *H04L 63/1408* (2013.01); *G06F 2009/4557* (2013.01); *G06F 2009/45595* (2013.01); *H04L 61/2525* (2013.01)

(58) Field of Classification Search
None
See application file for complete search history.

(56) References Cited

U.S. PATENT DOCUMENTS 8,572,677 B2 * 10/2013 Bartholomay ...... H04L 63/0227
726/1
8,705,513 B2 * 4/2014 Van Der Merwe ..... H04L 47/72
370/351

(Continued)

FOREIGN PATENT DOCUMENTS

CN 103885829 A 6/2014
EP 2485155 A1 8/2012

(Continued)

OTHER PUBLICATIONS

Omezzine, Aya; Yangui, Sami; Bellamine, Narjes; Tata, Samir. Mobile service micro-containers for Cloud environments. 2012 IEEE 21st International Workshop on Enabling Technologies: Infrastructure for Collaborative Enterprises (WETICE). http://ieeexplore.ieee.org/stamp/stamp.jsp?tp=&arnumber=6269719.*

(Continued)

*Primary Examiner* — Jeremiah Avery
(74) *Attorney, Agent, or Firm* — CKC & Partners Co., Ltd.

(57) ABSTRACT

A method for live migrating a virtual machine includes connecting to a virtual machine operated in a first host by a client; transmitting condition data of the virtual machine to a second host by the first host during a transmitting time, the first host and the second host being located at different net domains; transmitting a variance of condition data of the virtual machine generated in the transmitting time to the second host by the first host; providing a notification to the client to reconnect to the second host by the first host; modifying a network packets transmitting rule by the client based on the notification of the first host, and activating the virtual machine by the second host based on the condition data of the virtual machine and the variance of the condition (Continued)

data of the virtual machine thereby maintaining the connection between the client and the virtual machine.

20 Claims, 5 Drawing Sheets

(56) References Cited

U.S. PATENT DOCUMENTS

| | | | |
|---|---|---|---|
| 2004/0103321 A1* | 5/2004 | Wesinger, Jr. | B65B 11/004 726/15 |
| 2007/0171921 A1* | 7/2007 | Wookey | G06F 3/1415 370/401 |
| 2008/0077690 A1* | 3/2008 | Miyajima | G06F 9/5088 709/226 |
| 2008/0201414 A1 | 8/2008 | Amir Husain et al. | |
| 2012/0033673 A1* | 2/2012 | Goel | H04L 47/30 370/400 |
| 2012/0036244 A1* | 2/2012 | Ramachandra | H04L 29/12207 709/223 |
| 2012/0180043 A1 | 7/2012 | Tsirkin et al. | |
| 2012/0250682 A1* | 10/2012 | Vincent | H04L 12/4633 370/390 |
| 2014/0157264 A1 | 6/2014 | Russinovich et al. | |
| 2015/0113172 A1* | 4/2015 | Johnson | H04L 67/34 709/245 |

FOREIGN PATENT DOCUMENTS

| | | |
|---|---|---|
| JP | 2013168140 A | 8/2013 |
| KR | 20140011956 A | 1/2014 |
| TW | 201029412 A1 | 8/2010 |
| TW | 201118741 A1 | 6/2011 |
| TW | 201145170 A1 | 12/2011 |

OTHER PUBLICATIONS

Akoush, Sherif; Sohan, Ripduman; Rice, Andrew; Moore, Andrew W.; Hopper, Andy. Predicting the Performance of Virtual Machine Migration. 2010 IEEE International Symposium on Modeling, Analysis & Simulation of Computer and Telecommunicatioin Systems (MASCOTS). http://ieeexplore.ieee.org/stamp/stamp.jsp?tp=&arnumber=5581607.*

Franco Travostino et al., "Seamless Live Migration of Virtual Machines over the MAN/WAN", Elsevier Future Generation Computer Systems 2006, vol. 22 Issue 8, Oct. 2006, pp. 901-907.

Robert Bradford et al., "Live Wide-Area Migration of Virtual Machines Including Local Persistent State", VEE '07 Proceedings of the 3rd international conference on Virtual execution environments, pp. 169-179, Jun. 13-15, 2007, San Diego, California, USA.

* cited by examiner

METHOD FOR LIVE MIGRATING VIRTUAL MACHINE

RELATED APPLICATIONS

This application claims priority to Taiwanese Application Serial Number 104104834, filed Feb. 12, 2015, which is herein incorporated by reference.

BACKGROUND

Field of Invention

The present invention relates to the network service technology. More particularly, the present invention relates to a method for live migrating a virtual machine.

Description of Related Art

With the rapid progress of infrastructure as service (IaaS) in recent years, when live migration of virtual machines is performed, the reliability of the web service is increasingly important. If the web service is interrupted during the live migration process of the virtual machines, the reliability of the web service will be adversely affected, resulting in a bad web operation experience for users.

In view of the foregoing, problems and disadvantages are associated with existing products that require further improvement. However, those skilled in the art have not yet to find a solution.

SUMMARY

One aspect of the present disclosure is directed to a method for live migrating a virtual machine. The method for live migrating the virtual machine includes the steps of: connecting to a virtual machine operated in a first host by a client; transmitting condition data of the virtual machine to a second host by the first host during a transmitting time, wherein the first host and the second host are located at different net domains; transmitting a variance of condition data of the virtual machine generated in the transmitting time to the second host by the first host; providing a notification to the client to reconnect to the second host by the first host; and modifying a network packets transmitting rule by the client based on the notification of the first host such that the client is connected to the second host, and activating the virtual machine by the second host based on the condition data of the virtual machine and the variance of the condition data of the virtual machine, thereby maintaining the connection between the client and the virtual machine.

In view of the foregoing, embodiments of the present disclosure provide a method for live migrating a virtual machine to improve the problem of the reliability of the web service being adversely affected due to the web service being interrupted during a live migration process of the virtual machine, such that a bad web operation experience for users is avoided.

These and other features, aspects, and advantages of the present invention, as well as the technical means and embodiments employed by the present invention, will become better understood with reference to the following description in connection with the accompanying drawings and appended claims.

BRIEF DESCRIPTION OF THE DRAWINGS

The invention can be more fully understood by reading the following detailed description of the embodiment, with reference made to the accompanying drawings as follows.

In accordance with common practice, the various described features/elements are not drawn to scale but are drawn to best illustrate specific features/elements relevant to the present invention. Also, wherever possible, similar or the same reference numerals are used in the drawings and the description to refer to the same or similar parts.

DETAILED DESCRIPTION

The detailed description provided below in connection with the appended drawings is intended as a description of the present examples and is not intended to represent the only forms in which the present example may be constructed or utilized. The description sets forth the functions of the examples and the sequence of steps for constructing and operating the examples. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include singular forms of the same.

Figure 1:
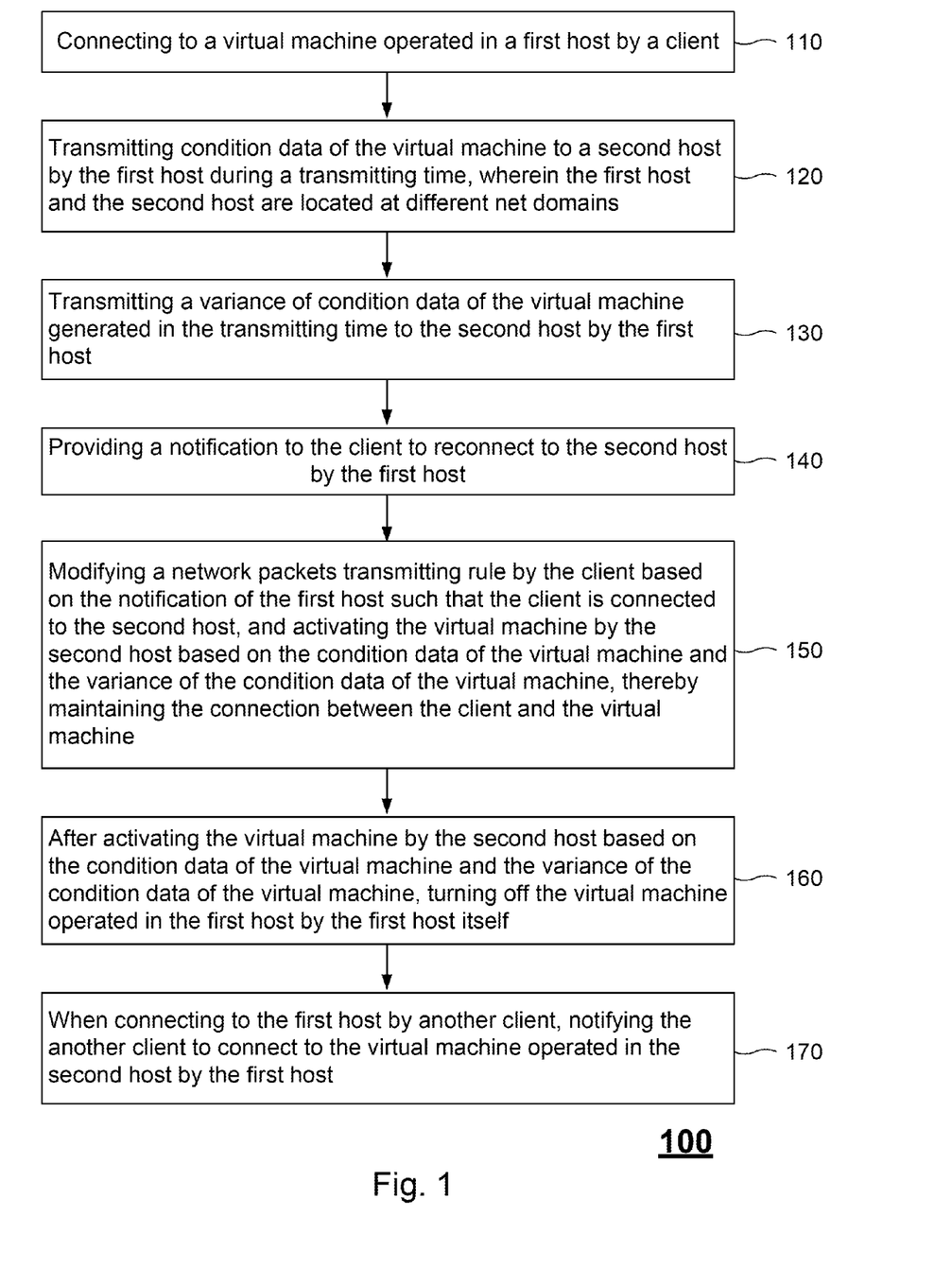
FIG. 1 is a flow diagram of a method for live migrating a virtual machine according to embodiments of the present invention.

FIG. 1 is a flow diagram of a method for live migrating a virtual machine according to embodiments of the present invention. As shown in FIG. 1, the method 100 for live migrating a virtual machine includes steps of:

step 110: connecting to a virtual machine operated in a first host by a client;

step 120: transmitting condition data of the virtual machine to a second host by the first host during a transmitting time, wherein the first host and the second host are located at different net domains;

step 130: transmitting a variance of condition data of the virtual machine generated in the transmitting time to the second host by the first host;

step 140: providing a notification to the client to reconnect to the second host by the first host; and step 150: modifying a network packets transmitting rule by the client based on the notification of the first host such that the client is connected to the second host, and activating the virtual machine by the second host based on the condition data of the virtual machine and the variance of the condition data of the virtual machine, thereby maintaining the connection between the client and the virtual machine.

For facilitating the understanding of the method 100 for live migrating the virtual machine in FIG. 1, reference is made to FIGS. 2~5 for describing each step of the method 100 for live migrating the virtual machine.

Figure 2:
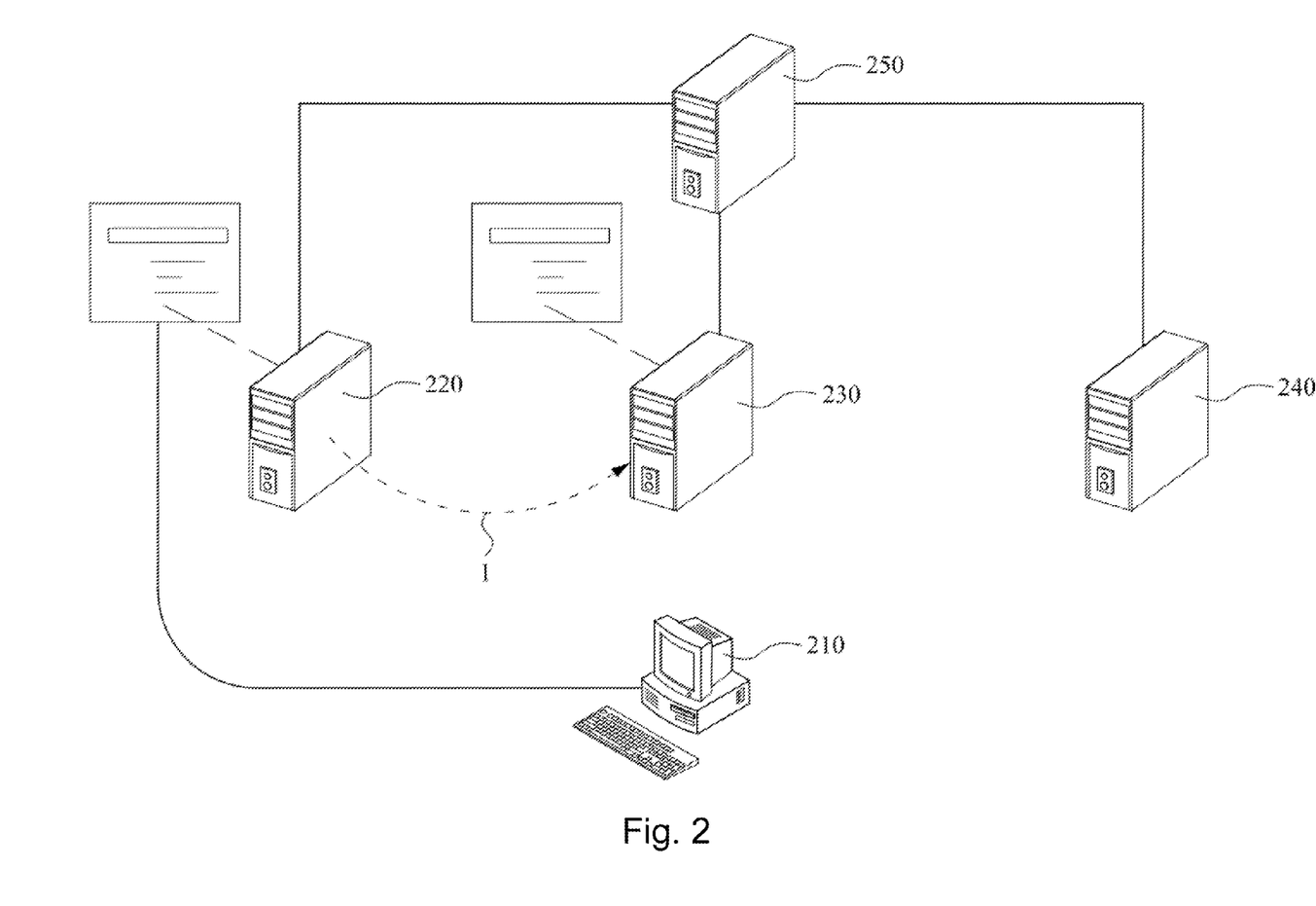
FIG. 2 is an operation diagram of the method for live migrating a virtual machine according to embodiments of FIG. 1 of the present invention.

FIG. 2 is an operation diagram of the method for live migrating a virtual machine according to embodiments of FIG. 1 of the present invention. First of all, referring both to step 110 of FIG. 1 and to FIG. 2, a client 210 is used to connect to a virtual machine operated in a first host 220. Secondly, referring both to step 120 of FIG. 1 and dashed line 1 of FIG. 2, the first host 220 is used to transmit condition data of the virtual machine to a second host 230 during a transmitting time. It is noted that the transmitting time is the time consumed by the first host 220 in transmitting condition data of the virtual machine to the second host 230. In addition, the first host 220 and the second host 230 are located at different net domains.

Figure 3:
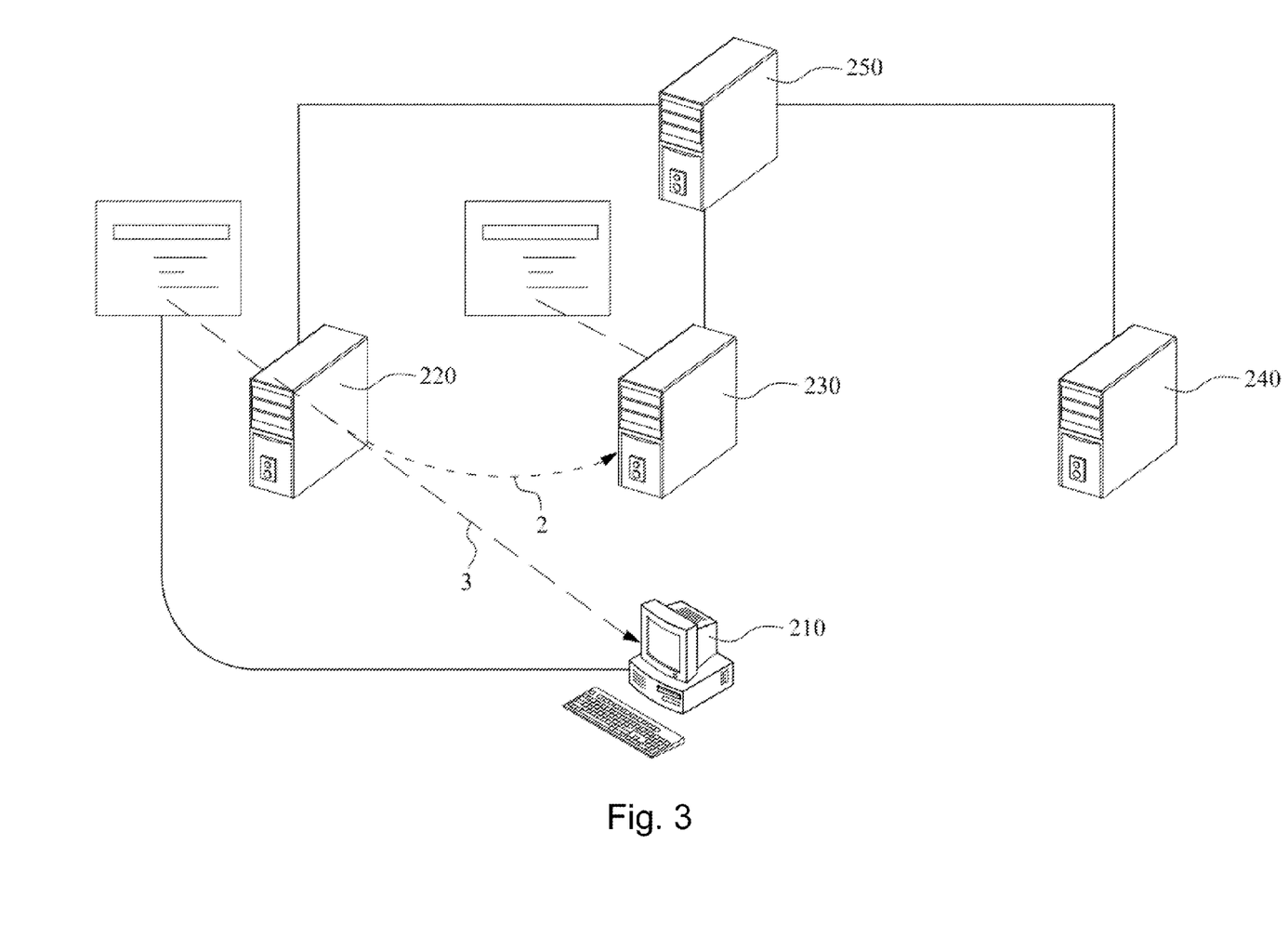
FIG. 3 is an operation diagram of the method for live migrating a virtual machine according to embodiments of FIG. 1 of the present invention.

FIG. 3 is an operation diagram of the method for live migrating a virtual machine according to embodiments of FIG. 1 of the present invention. First of all, referring both to step 130 of FIG. 1 and dashed line 2 of FIG. 3, the first host 220 is used to transmit to the second host 230 a variance of condition data of the virtual machine generated in the transmitting time. It is noted that time is consumed for the first host 220 to transmit condition data of the virtual machine to the second host 230. During the foregoing period of time, the condition data of the virtual machine operated in the first host 220 changes. Therefore, the variance of condition data of the virtual machine is transmitted to the second host 230.

Secondly, referring both to step 140 of FIG. 1 and dashed line 3 of FIG. 3, the first host 220 is used to provide a notification to the client 210 to reconnect to the second host 230. For example, the first host 220 can be used to provide a notification to the client 210 to transmit packages to the second host 230. That is to say, the first host 220 can be used to provide a notification to the client 210 of the destination where the packages are transmitted, and the destination is changed from the first host 220 to the second host 230.

Figure 4:
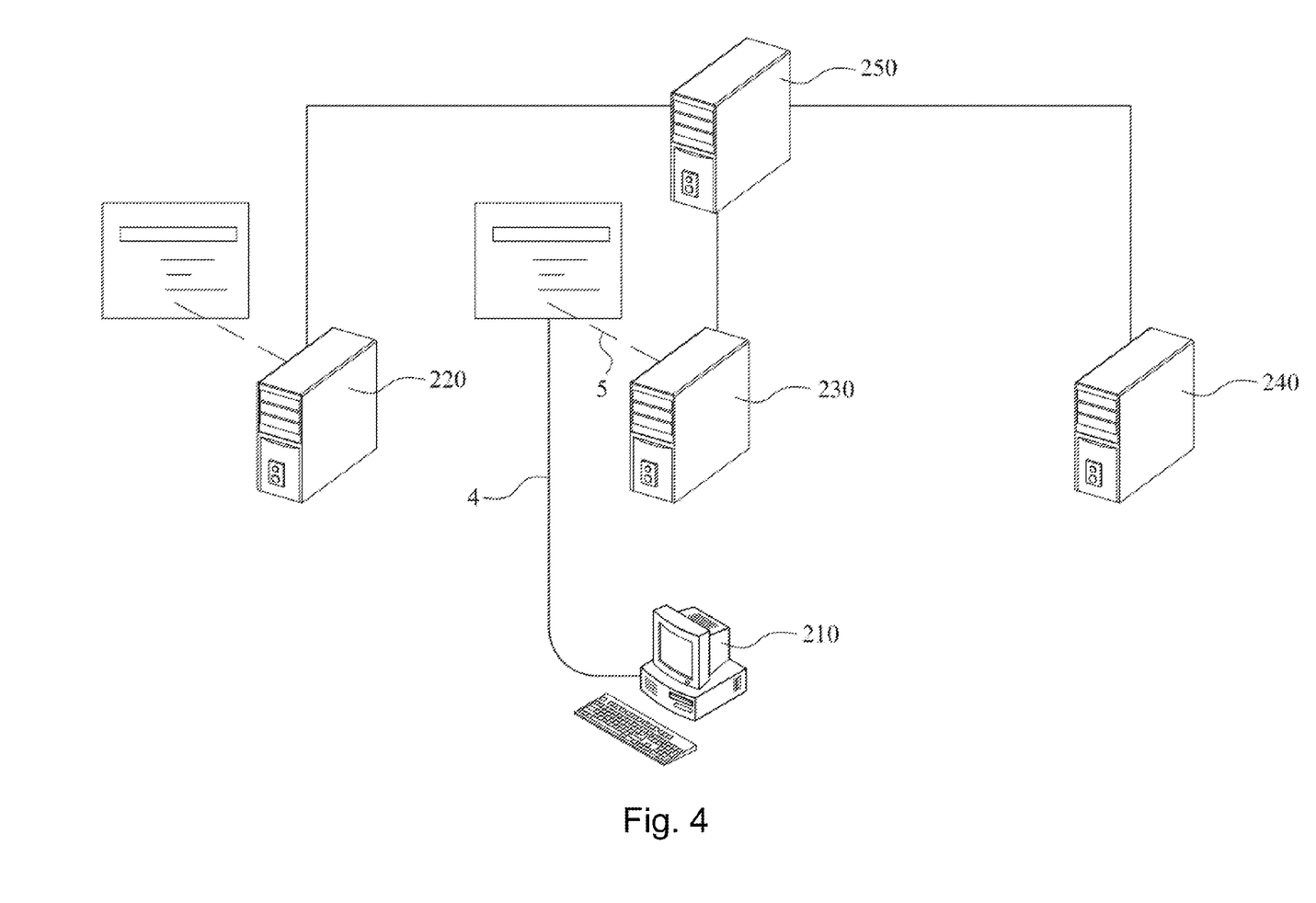
FIG. 4 is an operation diagram of the method for live migrating a virtual machine according to embodiments of FIG. 1 of the present invention.

FIG. 4 is an operation diagram of the method for live migrating a virtual machine according to embodiments of FIG. 1 of the present invention. First of all, referring both to step 150 of FIG. 1 and line 4 of FIG. 4, the client 210 is used for modifying a network packets transmitting rule based on the notification of the first host 220 such that the client 210 is connected to the second host 230. Specifically, the client 210 is used for modifying the network packets transmitting rule so as to modify an IP address to which the packages are transmitted. For instance, the IP address is modified from an IP address of the first host 220 to an IP address of the second host 230, such that the client 210 transmits the packages to the second host 230.

Secondly, referring both to step 150 of FIG. 1 and dashed line 5 of FIG. 4, the second host 230 is used to activate the virtual machine based on the condition data of the virtual machine and the variance of the condition data of the virtual machine, thereby maintaining the connection between the client 210 and the virtual machine. In one embodiment, the method 100 for live migrating a virtual machine of the present invention can modify an IP address to which the packages are transmitted and activate the virtual machine operated in the second host 230 simultaneously. Hence, when the client 210 transmits the packages to the second host 230, the virtual machine operated in the second host 230 is activated so as to make sure that the connection between the client 210 and the virtual machine will not be interrupted.

In sum, the method 100 for live migrating a virtual machine of the present invention makes the virtual machine maintain the web service during the live migration process (for example, the virtual machine is migrated from the first host 220 to the second host 230) through modifying a network packets transmitting rule of the client 210, such that the reliability of the web service can be enhanced and thereby result in a better web operation experience for users.

Referring back to FIG. 1, in another embodiment, the method 100 for live migrating the virtual machine further comprises the following steps:

step 160: after activating the virtual machine by the second host based on the condition data of the virtual machine and the variance of the condition data of the virtual machine, turning off the virtual machine operated in the first host by the first host itself; and step 170: when connecting to the first host by another client, notifying the another client to connect to the virtual machine operated in the second host by the first host.

Figure 5:
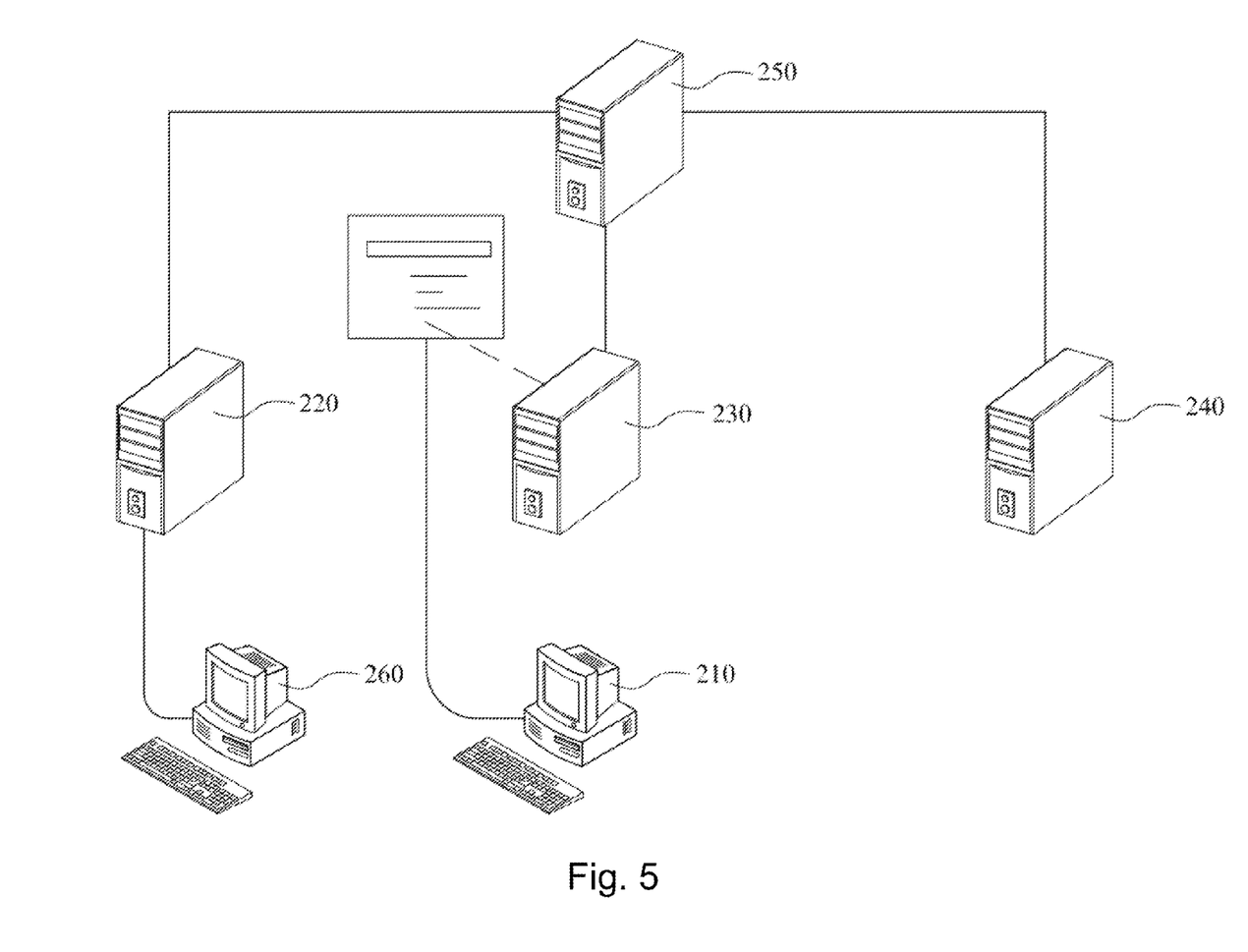
FIG. 5 is an operation diagram of the method for live migrating a virtual machine according to embodiments of FIG. 1 of the present invention.

For describing the foregoing steps in detail, reference is now made to FIG. 5, which is an operation diagram of the method for live migrating a virtual machine according to embodiments of FIG. 1 of the present invention. First of all, referring to the step 160 of FIG. 1, after the second host 230 is used to activate the virtual machine based on the condition data of the virtual machine and the variance of the condition data of the virtual machine, the first host 220 is used to turn off the virtual machine operated in the first host 220. Secondly, referring both to the step 170 of FIG. 1 and FIG. 5, when another client 260 connects to the first host 220, the first host 220 is used to notify the another client 260 to connect to the virtual machine operated in the second host 230.

In another embodiment, when the another client 260 connects to the first host 220, the first host 220 is used to determine whether the another client 260 is a malicious client. For example, the first host 220 is used to determine whether the another client 260 attacks the first host 220 premeditatedly by transmitting a large number of packages to the first host 220. The first host 220 is used to notify the another client 260 to connect to the virtual machine operated in the second host 230 if the first host 220 determines that the another client 260 is not a malicious client. For example, the another client 260 may be a client transmitting normal packages to the first host 220.

In contrast, if the first host 220 determines that the another client 260 is a malicious client, the first host 220 blocks the connection to the first host 220 of the another client 260 so as to prevent the virtual machine operated in the second host 230 from the attack of the another client 260 by transmitting a large number of packages.

It is noted that after the method 100 for live migrating a virtual machine of the embodiment of the present invention is performed, the virtual machine is operated by a destination machine 230. Therefore, if a new client 260 connects to a source machine 220, the source machine 220 reconnects the new client 260 to the destination machine 230. In addition, the source machine 220 is regarded as a barrier to filter the new client 260. If the new client 260 is a normal client, the source machine 220 reconnects the new client 260 to the destination machine 230. If the new client 260 is a malicious client, the source machine 220 blocks the connection of the new client 260.

Reference is now made to FIGS. 2-5. As shown in FIGS. 2-5, the first host 220, the second host 230 and the third host 240 are connected to a network file system (NFS) server 250. In another embodiment, the server 250 can be a common internet file system (CIFS) server or a Gluster file system (GlusterFS) server. As such, the first host 220, the second host 230 and the third host 240 can be connected to a NFS server, a CIFS server, or a GlusterFS server. In addition, the condition data of the virtual machine as described in the above-mentioned embodiments comprises central processing unit condition data, memory condition data, and file data. The file data can be stored in the NFS server 250.

Further, as may be appreciated by persons having ordinary skill in the art, the steps of the method for live migrating a virtual machine are named according to the function they perform, and such naming is provided to facilitate the understanding of the present disclosure and not to limit the steps. Combining the steps into a single step or dividing any one of the steps into multiple steps, or switching any step so as to be a part of another step falls within the scope of the embodiments of the present disclosure.

In view of the above embodiments of the present disclosure, it is apparent that the application of the present invention has a number of advantages. The embodiments of the present disclosure provide a method for live migrating a virtual machine to improve the problem of the reliability of a web service being affected due to the web service being interrupted during a live migration process of virtual machines, such that a bad web operation experience by users is avoided.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for live migrating a virtual machine from a first host to a second host, wherein the first host and the second host are connected to a primary server, comprising:
   connecting to the virtual machine operated in the first host by a client wherein the client connects to the primary server through the first host;
   transmitting condition data of the virtual machine, by the first host, to the second host during a transmitting time, wherein the first host and the second host are located at different net domains;
   transmitting a variance of condition data of the virtual machine generated in the transmitting time, by the first host, to the second host;
   providing a notification, by the first host, to inform the client to disconnect a connection with the first host and build a connection with the second host; and
   modifying a network packets transmitting rule, by the client, based on the notification of the first host such that the client connecting to the first host is exchanged to connect to the second host and to connect to the primary server through the second host, and activating the virtual machine, by the second host, based on the condition data of the virtual machine and the variance of the condition data of the virtual machine, thereby maintaining the connection between the client and the virtual machine operated in the second host,
   wherein the modifying the network packets transmitting rule and the activating the virtual machine by the second host results in the live migrating of the virtual machine from the first host to the second host.

2. The method for live migrating a virtual machine of claim 1, wherein the step of providing a notification to the client to reconnect to the second host by the first host comprises:
   providing a notification to the client to transmit packages to the second host by the first host.

3. The method for live migrating a virtual machine of claim 2, wherein the step of modifying a network packets transmitting rule by the client such that the client is connected to the second host comprises:
   modifying an IP address to which the packages are transmitted by the client, wherein the IP address is modified from an IP address of the first host to an IP address of the second host.

4. The method for live migrating a virtual machine of claim 3, wherein when the IP address to which the packages are transmitted is modified, the virtual machine operated in the second host is activated simultaneously.

5. The method for live migrating a virtual machine of claim 1, further comprising:
   after activating the virtual machine by the second host based on the condition data of the virtual machine and the variance of the condition data of the virtual machine, turning off the virtual machine operated in the first host by the first host itself.

6. The method for live migrating a virtual machine of claim 1, further comprising:
   when connecting to the first host by another client, notifying the another client to connect to the virtual machine operated in the second host by the first host.

7. The method for live migrating a virtual machine of claim 6, wherein the step of when connecting to the first host by the another client, notifying the another client to connect to the virtual machine operated in the second host by the first host comprises:
   when connecting to the first host by the another client, determining whether the another client is a malicious client by the first host, and notifying the another client to connect to the virtual machine operated in the second host by the first host if it is determined that the another client is not a malicious client by the first host.

8. The method for live migrating a virtual machine of claim 7, wherein the step of determining whether the another client is a malicious client by the first host comprises:
   blocking the connection to the first host of the another client by the first host if it is determined that the another client is a malicious client by the first host.

9. The method for live migrating a virtual machine of claim 1, wherein the primary server is a network file system (NFS) server, a common internet file system (CIFS) server, or a Gluster file system (GlusterFS) server.

10. The method for live migrating a virtual machine of claim 2, wherein the primary server is a network file system (NFS) server, a common Internet file system (CIFS) server, or a Gluster file system (GlusterFS) server.

11. The method for live migrating a virtual machine of claim 3, wherein the primary server is a network file system (NFS) server, a common internet file system (CIFS) server, or a Gluster file system (GlusterFS) server.

12. The method for live migrating a virtual machine of claim 4, wherein the primary server is a network file system (NFS) server, a common internet file system (CIFS) server, or a Gluster file system (GlusterFS) server.

13. The method for live migrating a virtual machine of claim 6, wherein the primary server is a network file system (NFS) server, a common Internet file system (CIFS) server, or a Gluster file system (GlusterFS) server.

14. The method for live migrating a virtual machine of claim 7, wherein the primary server is a network file system (NFS) server, a common Internet file system (CIFS) server, or a Gluster file system (GlusterFS) server.

15. The method for live migrating a virtual machine of claim 1, wherein the condition data of the virtual machine comprises a central processing unit condition data and a memory condition data.

16. The method for live migrating a virtual machine of claim 2, wherein the condition data of the virtual machine comprises a central processing unit condition data and a memory condition data.

17. The method for live migrating a virtual machine of claim 3, wherein the condition data of the virtual machine comprises a central processing unit condition data and a memory condition data.

18. The method for live migrating a virtual machine of claim 4, wherein the condition data of the virtual machine comprises a central processing unit condition data and a memory condition data.

19. The method for live migrating a virtual machine of claim 6, wherein the condition data of the virtual machine comprises a central processing unit condition data and a memory condition data.

20. The method for live migrating a virtual machine of claim 7, wherein the condition data of the virtual machine comprises a central processing unit condition data and a memory condition data.

* * * * *